(12) United States Patent
Tseng

(10) Patent No.: US 8,073,493 B2
(45) Date of Patent: Dec. 6, 2011

(54) PORTABLE ELECTRONIC APPARATUS AND OPERATING METHOD THEREOF

(75) Inventor: Gary Tseng, Taipei (TW)

(73) Assignee: E-TEN Information Systems Co., Ltd., Taipei (TW)

( * ) Notice: Subject to any disclaimer, the term of this patent is extended or adjusted under 35 U.S.C. 154(b) by 448 days.

(21) Appl. No.: 12/344,978

(22) Filed: Dec. 29, 2008

(65) Prior Publication Data

US 2009/0325644 A1 Dec. 31, 2009

(30) Foreign Application Priority Data

Jun. 27, 2008 (TW) ................................ 97124146 A

(51) Int. Cl.
*H04M 3/436* (2006.01)

(52) U.S. Cl. ..................... 455/566; 345/207; 455/415

(58) Field of Classification Search .................. 455/415, 455/566; 345/1.3, 2.1, 158, 207
See application file for complete search history.

(56) References Cited

U.S. PATENT DOCUMENTS

| | | | | |
|---|---|---|---|---|
| 6,125,286 A * | 9/2000 | Jahagirdar et al. | ............ | 455/566 |
| 2007/0133223 A1 * | 6/2007 | Fredley et al. | ................ | 362/600 |
| 2007/0298844 A1 * | 12/2007 | Hamamura et al. | .......... | 455/566 |
| 2008/0090621 A1 * | 4/2008 | Yokodate et al. | ............. | 455/566 |
| 2008/0180581 A1 * | 7/2008 | Slobodin et al. | .............. | 348/744 |
| 2009/0069056 A1 * | 3/2009 | Lee et al. | ...................... | 455/566 |
| 2009/0160734 A1 * | 6/2009 | Chuang | ......................... | 345/1.3 |
| 2009/0303215 A1 * | 12/2009 | Shiozaki | ....................... | 345/207 |
| 2009/0322691 A1 * | 12/2009 | Chiu | ............................. | 345/173 |

FOREIGN PATENT DOCUMENTS

| EP | 2139210 A2 * | 12/2009 |
|---|---|---|
| KR | 2007010714 A * | 1/2007 |

* cited by examiner

*Primary Examiner* — Howard Williams
(74) *Attorney, Agent, or Firm* — Patterson & Sheridan, LLP

(57) ABSTRACT

A portable electronic apparatus is disclosed. The portable electronic apparatus comprises a casing, a first displaying module, a second displaying module, a communicating module, a sensing module, and a controlling module. The first displaying module and the second displaying module are set on a first face and a second face of the casing respectively. When the communicating module receives an incoming call signal, the communicating module generates a starting signal. Then, the sensing module receives the starting signal and performs a sensing procedure to generate a sensing result. The controlling module selectively displays an incoming call information related to the incoming call signal on the first displaying module or the second displaying module according to the sensing result.

7 Claims, 6 Drawing Sheets

PORTABLE ELECTRONIC APPARATUS AND OPERATING METHOD THEREOF

BACKGROUND OF THE INVENTION

1. Field of the Invention

The invention relates to a portable electronic apparatus, and more particularly, to a dual-monitor portable electronic apparatus capable of automatically displaying an incoming call message on the suitable reading monitor and the operating method thereof.

2. Description of the Prior Art

In recent years, with the development of mobile communication technology, various kinds of mobile phones have been launching to the market, and the functions of mobile phone are becoming more and more powerful currently. For example, a dual-monitor PDA mobile phone has been gradually attracting ordinary consumers' attention.

As implied by its name, the dual-monitor PDA mobile phone has a monitor on both of the front face and the back face respectively. One face of the dual-monitor PDA mobile phone, like an ordinary mobile phone, provides an operating interface and functions; the other face of the dual-monitor PDA mobile phone can be used as a PDA. Therefore, when a user operates the dual-monitor PDA mobile phone, he/she can freely choose the PDA function or the mobile phone function he/she wants to use by switching the front face to the back face of the PDA mobile phone.

However, in practical applications, the current dual-monitor PDA mobile phone is still inconvenient for users. For example, when a user is operating the PDA face of the dual-monitor PDA mobile phone, an incoming call signal is received. In general, the user has to switch the PDA face to the mobile phone face by hands, so the incoming call information displayed on the monitor of the mobile phone face can be read and the incoming call can be listened to by the user. It is inconvenient for the user to use the conventional dual-monitor PDA mobile phone. Therefore, the current dual-monitor PDA mobile phone is still not convenient and humanistic enough for the user.

Therefore, the invention provides a portable electronic apparatus and operating method thereof to solve the above-mentioned problems.

SUMMARY OF THE INVENTION

A scope of the invention is to provide a dual-monitor portable electronic apparatus. When the portable electronic apparatus receives an incoming call, the portable electronic apparatus can automatically display an incoming call message on a suitable reading monitor so that the user can read the incoming call message more convenient.

A first embodiment of the invention is a dual-monitor portable electronic apparatus. The portable electronic apparatus comprises a casing, a first displaying module, a second displaying module, a communicating module, a sensing module, and a controlling module. The first displaying module is disposed on a first face of the casing and the second displaying module is disposed on a second face of the casing. When the communicating module receives an incoming call signal, the communicating module generates a starting signal. Next, when the sensing module receives the starting signal from the communicating module, the sensing module performs a sensing procedure to generate a sensing result. Then, the controlling module receives the sensing result and selectively displays an incoming call information on the first displaying module or the second displaying module according to the sensing result, wherein the incoming call information relates to the incoming call signal.

In this embodiment, the above-mentioned sensing result relates to a suitable reading face chosen between the first face and the second face. In addition, the above-mentioned sensing procedure can determine which one of the first face and the second face is the suitable reading face by an optical way or a gravity sensing way.

A second embodiment of the invention is a portable electronic apparatus operating method. The portable electronic apparatus comprises a first displaying module on its first face and a second displaying module on its second face. In this embodiment, at first, the method judges whether the portable electronic apparatus receives an incoming call signal. If the judging result is that the portable electronic apparatus receives the incoming call signal, the method performs a sensing procedure to generate a sensing result. Then, the method selectively displays an incoming call information on the first displaying module or the second displaying module according to the sensing result, wherein the incoming call information relates to the incoming call signal.

In fact, the sensing result relates to a suitable reading face chosen between the first face and the second face for the user. In addition, the above-mentioned sensing procedure can determine that between the first face and the second face which one is the suitable reading face by an optical way or a gravity sensing way.

A third embodiment of the invention is a dual-monitor portable electronic apparatus. The portable electronic apparatus comprises a casing, a first displaying module, a second displaying module, a starting module, a sensing module, and a controlling module. The first displaying module is disposed on a first face of the casing and the second displaying module is disposed on a second face of the casing. When the starting module receives a specific signal, the starting module generates a starting signal. When the sensing module receives the starting signal, the sensing module will perform a sensing procedure to generate a sensing result. Then, the controlling module selectively displays an information on the first displaying module or the second displaying module according to the sensing result.

A fourth embodiment of the invention is a dual-monitor portable electronic apparatus. The portable electronic apparatus comprises a casing, a first displaying module, a second displaying module, a starting module, a sensing module, and a controlling module. The first displaying module is disposed on a first face of the casing and the second displaying module is disposed on a second face of the casing. When the starting module receives a specific signal, the starting module generates a starting signal. When the sensing module receives the starting signal, the sensing module performs a sensing procedure to generate a sensing result. The difference between this embodiment and the third embodiment is that the controlling module selectively controls the first displaying module or the second displaying module under a specific state according to the sensing result.

Compared to the prior art, the portable electronic apparatus according to the invention can automatically select a suitable reading monitor from the two monitors for the user and display an incoming call message on the monitor. Therefore, the dual-monitor portable electronic apparatus according to the invention can prevent the inconvenience of operating the conventional dual-monitor portable electronic apparatus by hand and provide the user more convenient and humanistic operating experience.

The advantage and spirit of the invention may be further understood by the following recitations together with the appended drawings.

BRIEF DESCRIPTION OF THE APPENDED DRAWINGS

Figure 2:
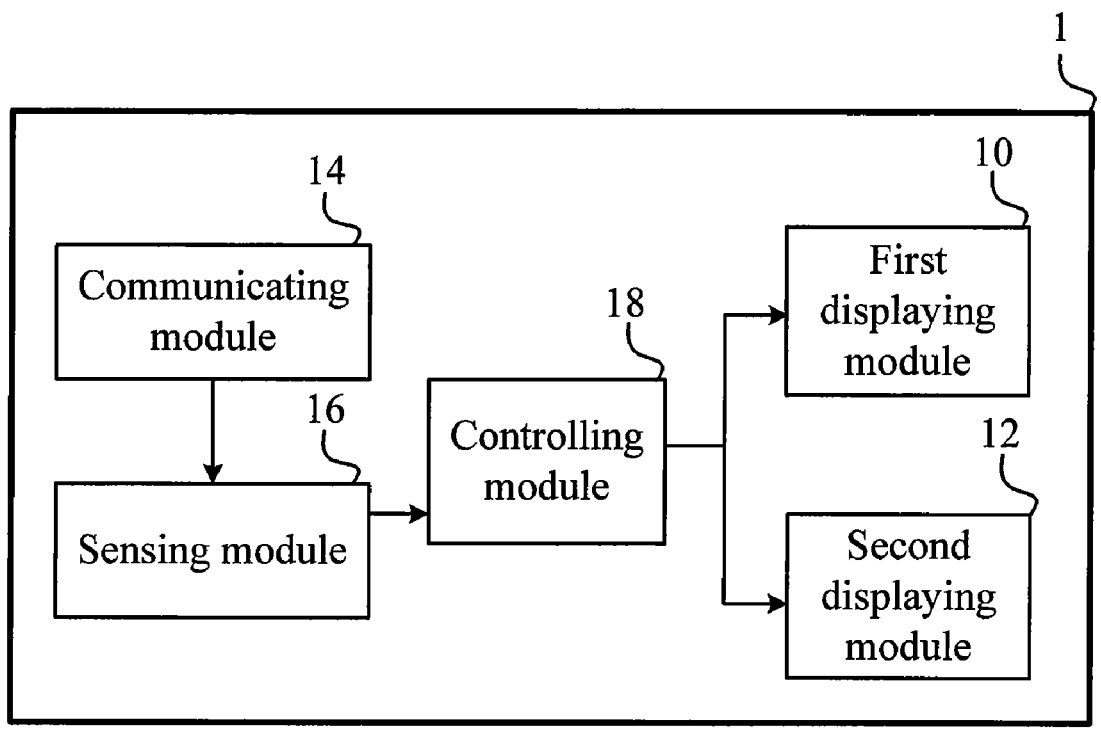
FIG. 2 shows a functional block diagram of the portable electronic apparatus according to the first embodiment of the invention.
Figure 3A:
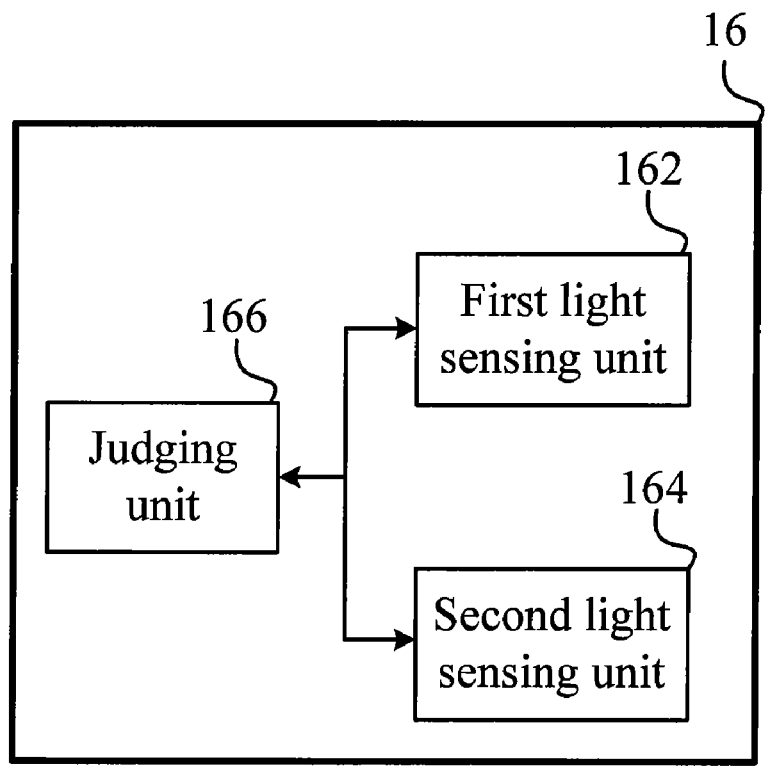
Figure 3B:
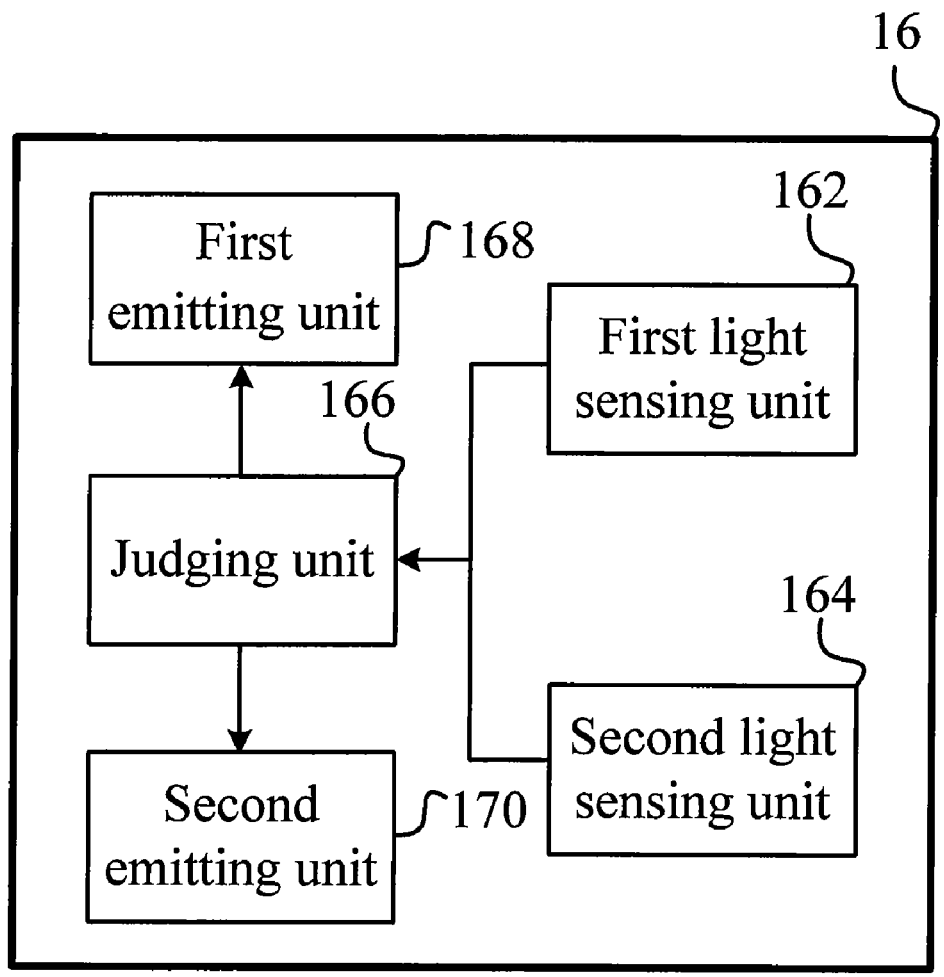
Figure 3C:
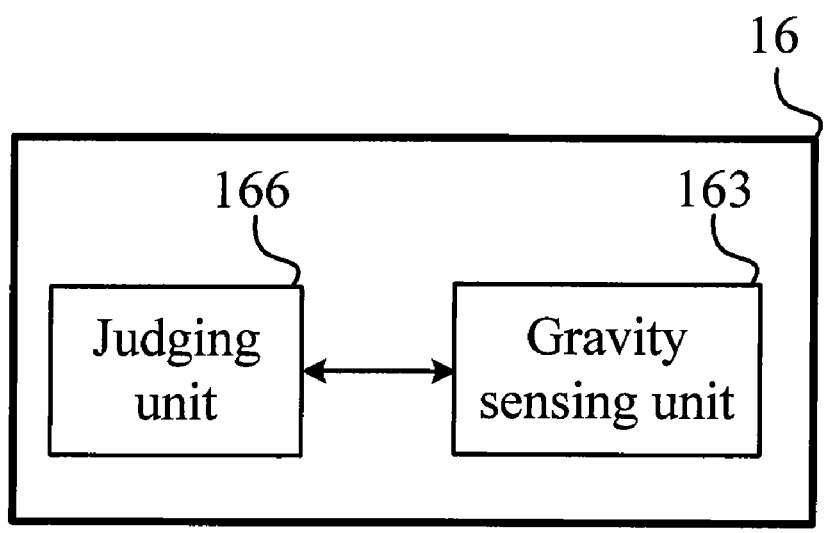

FIG. 3(A), FIG. 3(B), and FIG. 3(C) show the detail functional block diagram of the sensing module shown in FIG. 2 respectively.

Figure 4A:
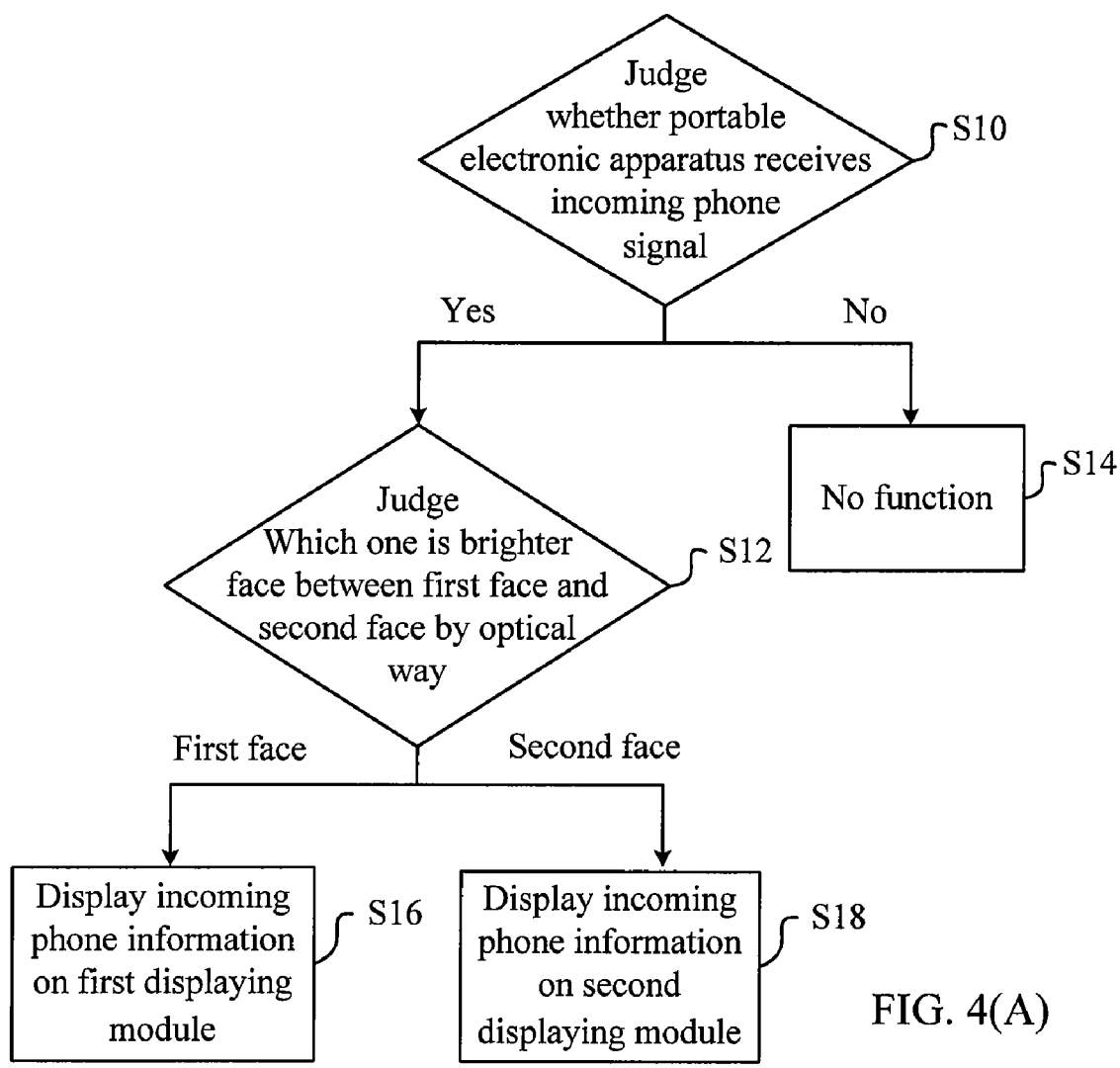
Figure 4B:
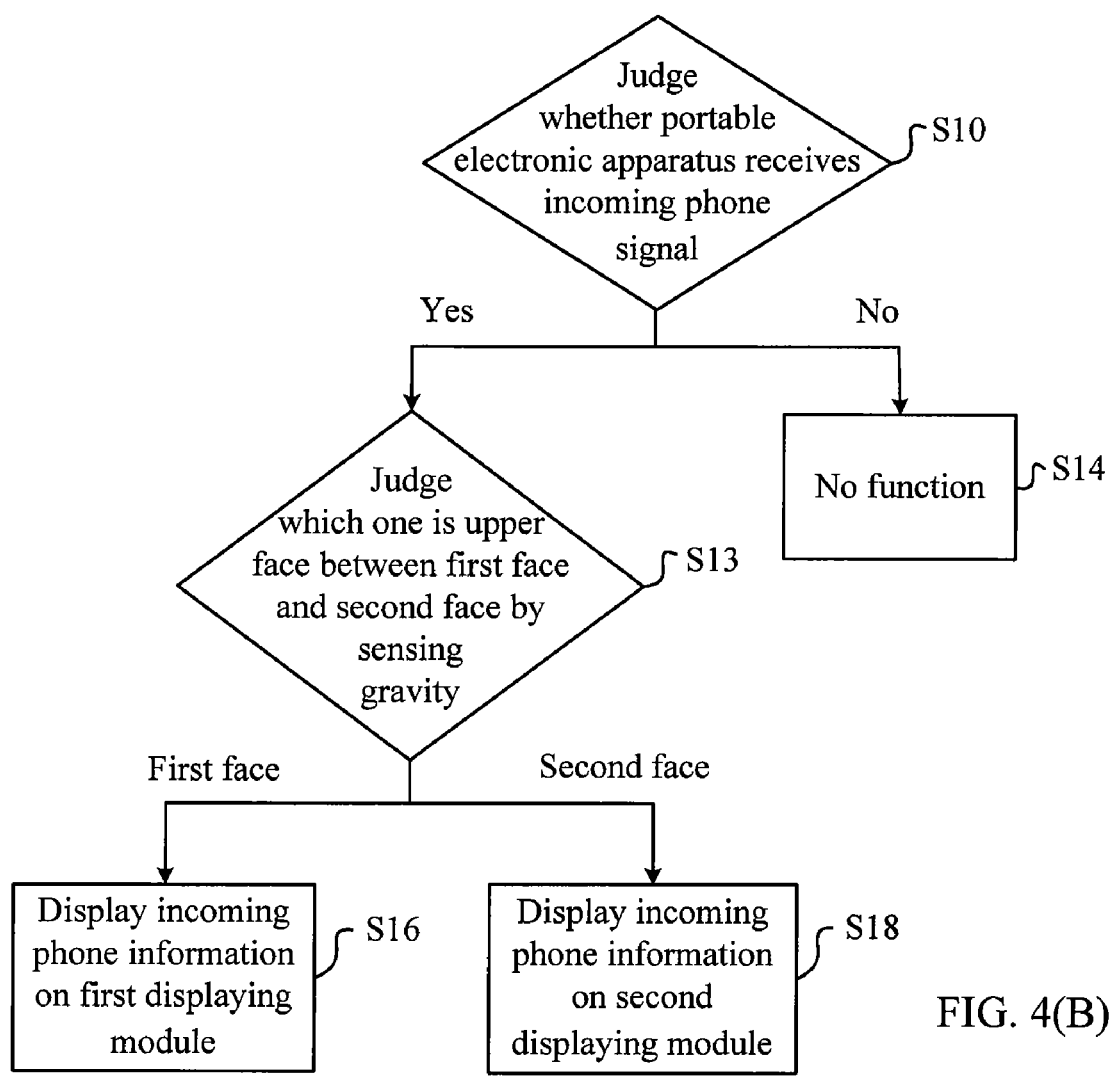

FIG. 4(A) and FIG. 4(B) show the flow chart of the portable electronic apparatus operating method according to the second embodiment of the invention respectively.

Figure 5:
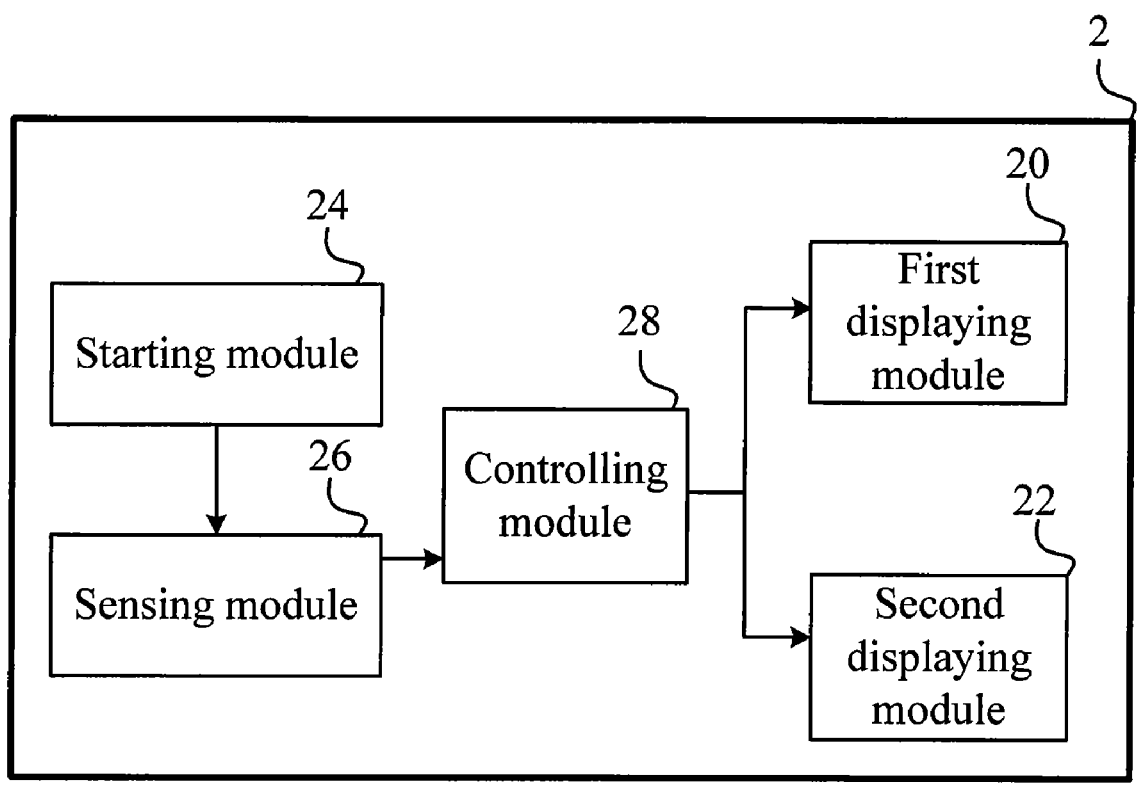

FIG. 5 shows a functional block diagram of the portable electronic apparatus according to the third embodiment and the fourth embodiment of the invention.

DETAILED DESCRIPTION OF THE INVENTION

The invention provides a dual-monitor portable electronic apparatus. When the portable electronic apparatus receives an incoming call, the portable electronic apparatus can automatically display an incoming call message on a suitable reading monitor so that the user can read the incoming call message more conveniently. In fact, the dual-monitor portable electronic apparatus according to the invention can be a dual-monitor PDA mobile phone, or any other electronic apparatus with two monitors.

Figure 1A:
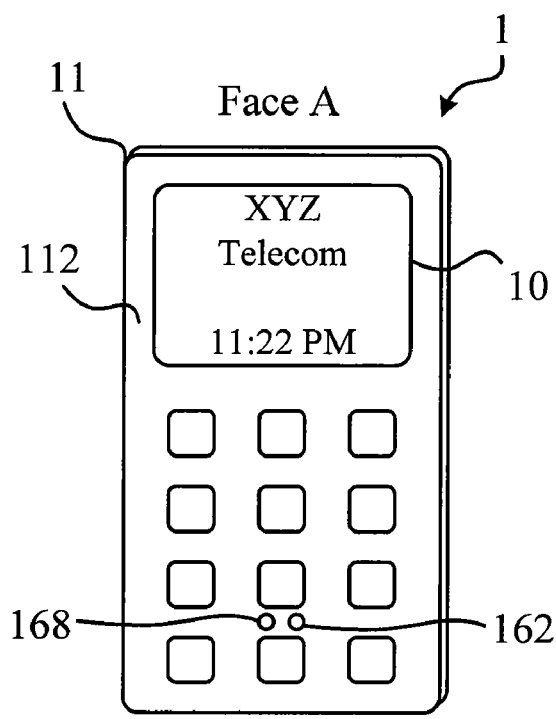
FIG. 1(A) shows a diagram of face A of the portable electronic apparatus according to the first embodiment of the invention.
Figure 1B:
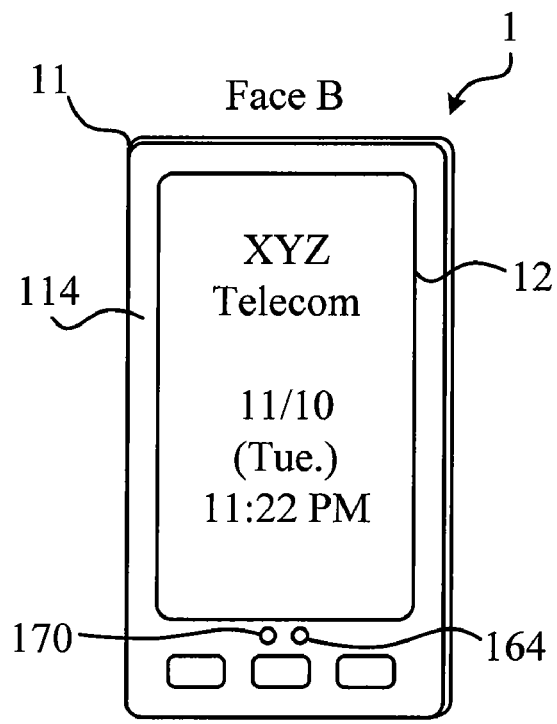
FIG. 1(B) shows a diagram of face B of the portable electronic apparatus according to the first embodiment of the invention.

A first embodiment according to the invention is a dual-monitor portable electronic apparatus. Please refer to FIG. 1(A) and FIG. 1(B). FIG. 1(A) and FIG. 1(B) show the diagram of the two faces of the portable electronic apparatus respectively. In this embodiment, it is assumed that the portable electronic apparatus is a dual-monitor PDA mobile phone. As shown in FIG. 1(A) and FIG. 1(B), the portable electronic apparatus (the dual-monitor PDA mobile phone) 1 comprises a casing 11, a first displaying module (mobile monitor) 10, a second displaying module (PDA monitor) 12. The casing 11 has a first face (face A) 112 and a second face (face B) 114. The first displaying module 10 is disposed on the first face 112 and the second displaying module 12 is disposed on the second face 114. In fact, the first displaying module 10 and the second displaying module 12 can be a LCD monitor or any other types of displayer.

Next, please refer to FIG. 2. FIG. 2 shows the functional block diagram of the portable electronic apparatus. As shown in FIG. 2, the portable electronic apparatus 1 comprises the first displaying module 10, the second displaying module 12, a communicating module 14, a sensing module 16, and a controlling module 18. The sensing module 16 is coupled to the communicating module 14; the controlling module 18 is coupled to the first displaying module 10, the second displaying module 12, and the sensing module 16. Then, the modules of the portable electronic apparatus 1 and the functions thereof will be induced as follows.

In this embodiment, the communicating module 14 is used to communicate with the outside world via a communication network. Thus, the communicating module 14 can receive an incoming call signal from the outside world via the communication network. The communicating module 14 comprises an antenna, a circuit, and other necessary software/hardware elements. The communication network can be a 2G/3G communication network system or other communication network systems. When the communicating module 14 receives the incoming call signal, the communicating module 14 will generate a starting signal and transmit the starting signal to the sensing module 16. Then, when the sensing module 16 receives the starting signal, the sensing module 16 will perform a sensing procedure to generate a sensing result.

It must be pointed out that the incoming call signal received by the above-mentioned communicating module 14 is not limited to the voice communication. The incoming call signal of the invention can also be a SMS (Short Message Service) message, a MMS (Multi-media Message Service) message, or other forms of voice/data message.

It should be noticed that in other embodiments, it is not necessary for the sensing module 16 to be started to perform the sensing procedure by the starting signal. The sensing module 16 can be set to continuously perform the sensing procedure once the portable electronic apparatus 1 is powered on. However, as described in this embodiment, it is better for the sensing module 16 to perform the sensing procedure when the portable electronic apparatus 1 receives the incoming call so that the senseless power waste can be prevented.

In fact, the sensing result, generated by performing the sensing procedure by the sensing module 16, relates to a "suitable reading face" chosen between the first face 112 and the second face 114 of the portable electronic apparatus 1. It should be noticed that the so-called "suitable reading face" is the face that is more convenient for the user to read the message shown on the monitor of the face. It is also the face that the user watches when he/she uses the portable electronic apparatus 1.

For example, it is assumed that the sensing result generated by performing the sensing procedure by the sensing module 16 is that the suitable reading face is the first face 112. That is to say, it is possible that the user watches the first face 112 of the portable electronic apparatus 1 now. The several possible ways of the sensing procedure performed by the sensing module 16 will be discussed later.

Then, the controlling module 18 will be introduced. As shown in FIG. 2, the controlling module 18 is coupled to the first displaying module 10, the second displaying module 12, and the sensing module 16. In this embodiment, the controlling module 18 can be a program, a circuit, or any other suitable form of element. After the controlling module 18 receives the sensing result from the sensing module 16, the controlling module 18 will selectively display an incoming call information on the first displaying module 10 or the second displaying module 12 according to the sensing result, wherein the incoming call information relates to the incoming call signal. In fact, the incoming call information shown on the mobile monitor usually comprises the related information about the incoming call, such as the phone number and the name/the company name.

In this embodiment, because the sensing result comprises the information about the so-called "suitable reading face" chosen between the first face 112 and the second face 114, the controlling module 18 can selectively display the incoming call information on the first displaying module 10 or the second displaying module 12 according to the information about which face is the suitable reading face.

For example, if the suitable reading face is the first face 112, the controlling module 18 will display the incoming call information on the first displaying module 10 of the first face 112; if the suitable reading face is the second face 114, the controlling module 18 will display the incoming call information on the second displaying module 12 of the second face 114. By doing so, when the portable electronic apparatus 1 receives the incoming call, the portable electronic apparatus 1 can automatically perform the monitor selection and display the incoming call information on the selected monitor which is convenient for the user to read the incoming call information.

Next, the several possible ways of the sensing procedure performed by the sensing module 16 will be discussed. The first way is that the sensing module 16 performs the sensing procedure by an optical way. In this way, the sensing module 16 can comprise a first light sensing unit 162, a second light sensing unit 164, and a judging unit 166, as shown in FIG. 3(A). In addition, as shown in FIG. 1(A) and FIG. 1(B), the first light sensing unit 162 is disposed on the first face 112 and the second light sensing unit 164 is disposed on the second face 114. After the judging unit 166 of the sensing module 16 receives the starting signal, the judging unit 166 will control the first light sensing unit 162 to sense the light intensity received by the first face 112, and control the second light sensing unit 164 to sense the light intensity received by the second face 114. The above-mentioned first light sensing unit 162 and second light sensing unit 164 can be a well-known light sensor; the judging unit 166 can be realized via a program, a circuit, or any other suitable forms.

Then, the judging unit 166 will judge which one is the brighter face between the first face 112 and the second face 114, according to the light intensities of the first face 112 and the second face 114 sensed by the first face 112 and the second face 114 respectively. That is to say, if the judging result of the judging unit 166 is that the light intensity sensed by the first light sensing unit 162 is stronger, the first face 112 will be the brighter face, and vice versa.

It should be noticed that the so-called "brighter face" equals to the above-mentioned "suitable reading face". Thus, the controlling module 18 will control the monitor of the brighter face (e.g., the first displaying module 10 of the first face 112) displays the incoming call information according to the sensing result.

In the second way, the sensing module 16 also performs the sensing procedure by an optical way. It should be noticed that the difference between the first way and the second way is that before the sensing module 16 performs the light sensing, the sensing module 16 emits a specific light (e.g., the infrared rays). As shown in FIG. 3(B), the sensing module 16 comprises not only the first light sensing unit 162, the second light sensing unit 164, and the judging unit 166, but also a first emitting unit 168 and a second emitting unit 170. As shown in FIG. 1(A) and FIG. 1(B), the first emitting unit 168 is disposed on the first face 112 and the second emitting unit 170 is disposed on the second face 114.

After the judging unit 166 receives the starting signal, the judging unit 166 will control the first emitting unit 168 and the second emitting unit 170 to emit the specific lights from the first face 112 and the second face 114 respectively. After the specific lights are emitted by the sensing module 16 and the specific lights are blocked by an object or other obstruction, the specific lights are possible to be reflected or refracted back to the portable electronic apparatus 1, and received by the first light sensing unit 162 and the second light sensing unit 164 respectively.

Therefore, the judging unit 166 of the portable electronic apparatus 1 can determine the distance d1 between the first face 112 and the object according to a time interval T1. T1 is the time interval between a time t11 that the first emitting unit 168 emits the specific light from the first face 112 and a time t12 that the first light sensing unit 162 receives the reflected specific light. Similarly, the judging unit 166 can also determine the distance d2 between the second face 114 and the object according to a time interval T2. T2 is the time interval between a time t21 that the second emitting unit 170 emits the specific light from the second face 114 and a time t22 that the second light sensing unit 164 receives the reflected specific light.

Then, the controlling module 18 will calculate the possible using state of the user for the moment according to the sensing result (d1 and d2) obtained by the sensing module 16, and selectively display the incoming call information on the first displaying module 10 of the first face 112 or the second displaying module 12 of the second face 114.

For example, if d1 is 0.05 cm and d2 is 10 cm, at this time, it is possible that the portable electronic apparatus 1 is set upon a desk, and the first face 112 of the portable electronic apparatus 1 is downward and the second face 114 is upward. Thus, the controlling module 18 will display the incoming call information on the second face 114 according to this calculating result so that the user can easily read the incoming call information.

As to the third way, the sensing module 16 performs the sensing procedure by sensing gravity. As shown in FIG. 3(C), the sensing module 16 can comprise a gravity sensing unit 163 and a judging unit 166. In fact, the gravity sensing unit 163 can be a G-sensor set on the first face 112 or the second face 114.

In addition, not only the optical and gravity sensing ways used in the above-mentioned examples, but also any other electrical elements capable of sensing the orientation of the portable electronic apparatus 1 can be used.

After the judging unit 166 receives the starting signal, the judging unit 166 will control the gravity sensing unit 163 to perform the sensing procedure. Then, the judging unit 166 will judge which one is "the upper face" between first face 112 and the second face 114, according to the sensing result of the gravity sensing unit 163.

It should be noticed that the so-called "upper face" is the face with higher position of the two faces of the portable electronic apparatus 1. When the portable electronic apparatus 1 is inserted into a charging base or held by a user, an angle of elevation is formed between the portable electronic apparatus 1 and the horizontal. The face near the user is "the upper face", and the other face away from the user is "the lower face". Because it is possible that the upper face is the face that the user watches when he/she uses the portable electronic apparatus 1, the controlling module 18 will display the incoming call information on the monitor of the upper face. For example, if the judging result of the judging unit 166 is that the second face 114 is the upper face, it means that the user may watch the second face 114 at the moment, so that the controlling module 18 will display the incoming call information on the second displaying module 12 of the second face 114.

A second embodiment of the invention is a portable electronic apparatus operating method. The portable electronic apparatus comprises a first displaying module on its first face and a second displaying module on its second face. In fact, the first displaying module and the second displaying module can be a LCD monitor or any other forms of displaying apparatuses.

Please refer to FIG. 4(A). FIG. 4(A) shows the flow chart of the method. As shown in FIG. 4(A), at first, the method performs step S10 to judge whether the portable electronic apparatus receives an incoming call signal. Then, two possible judging results of step S10 will be discussed respectively. If the judging result of step S10 is no, it means that the portable electronic apparatus does not receive the incoming call signal. Thus, the method performs step S14 not to anything. If the judging result of step S10 is yes, it means that the portable electronic apparatus receives the incoming call signal, so the method will perform the sensing procedure to generate the sensing result. As shown in FIG. 4(A), the method can perform step S12 to judge which one is the brighter face between the first face and the second face by the optical way.

In practical applications, the method can sense the light intensities received by the first face and the second face of the portable electronic apparatus respectively, and determine which face is the brighter face according to the face receiving stronger light intensity. In addition, the method can firstly emit a specific light (e.g., the infrared rays) from the first face and the second face respectively and sense the specific light reflected by an object to determine the distance between the first face/the second face and the object.

Then, if the judging result of step S12 is that the first face is the brighter face, then the method performs step S16 to display the incoming call information on the first displaying module of the first face; if the judging result of step S12 is that the second face is the brighter face, then the method performs step S18 to display the incoming call information on the second displaying module of the second face.

In addition, as shown in FIG. 4(B), if the judging result of step S10 is yes, the method can also perform step S13 to judge which one is the upper face between the first face or the second face by the sensing gravity. It should be noticed that the so-called "upper face" is the face with higher position of the two faces of the portable electronic apparatus. Because it is possible that the upper face is the face that the user watches when he/she uses the portable electronic apparatus, the method will display the incoming call information on the monitor of the upper face.

A third embodiment of the invention is a dual-monitor portable electronic apparatus. The two monitors are disposed on the first face and the second face of the portable electronic apparatus respectively. The actual condition can refer to FIG. 1(A) and FIG. 1(B). Please refer to FIG. 5. FIG. 5 shows the functional block diagram of the portable electronic apparatus. As shown in FIG. 5, the portable electronic apparatus 2 comprises a first displaying module 20, a second displaying module 22, a starting module 24, a sensing module 26, and a controlling module 28. The sensing module 26 is coupled to the starting module 24; the controlling module 28 is coupled to the first displaying module 20, the second displaying module 22, and the sensing module 26. Then, the modules of the portable electronic apparatus 2 and the functions thereof will be induced as follows.

In this embodiment, when the staring module 24 receives a specific signal, the starting module 24 will generate a starting signal. For example, when the starting module 24 receives an incoming call or a short message from the outside world via a communication network, the starting module 24 will generate a starting signal and transmit the starting signal to the sensing module 26. Then, after the sensing module 26 receives the starting signal, the sensing module 26 will perform a sensing procedure to generate a sensing result.

It should be noticed that it is not necessary for the sensing module 26 to be started to perform the sensing procedure by the starting signal. After the portable electronic apparatus 2 is powered on, the sensing module 26 can continuously perform the sensing procedure. However, in practice, it is better for the sensing module 26 to perform the sensing procedure when the portable electronic apparatus 2 receives the incoming call or the short message to prevent the senseless power waste.

In practical applications, the sensing result generated by the sensing module 26 can relate to a "suitable reading face" chosen between the first face and the second face of the portable electronic apparatus 2. It should be noticed that the so-called "suitable reading face" is the face that is more convenient for the user to read the message shown on the monitor of the face. It is also the face that the user watches when he/she uses the portable electronic apparatus 2.

For example, if the sensing result generated by performing the sensing procedure by the sensing module 26 is that the suitable reading face is the first face of the portable electronic apparatus 2. That is to say, it is possible that the user watches the first face of the portable electronic apparatus 2, and vice versa. As to the ways the sensing module 26 performs the sensing procedure can comprise the following ways.

The first way is that the sensing module 26 performs the sensing procedure by an optical way. At first, the sensing module 26 will judge which one receives stronger light intensity between the first face and the second face of the portable electronic apparatus 2. If the judging result of the sensing module 26 is that the first face of the portable electronic apparatus 2 receives stronger light intensity, then the first face is considered as "the brighter face", and vice versa. It should be noticed that the so-called "brighter face" equals to the above-mentioned "suitable reading face". Then, the controlling module 28 will control the monitor of the brighter face (e.g., the first displaying module 20 of the first face) to display an information according to the sensing result.

In fact, the information can relate to a specific signal received by the starting module 24. For example, if the specific signal received by the starting module 24 is an incoming signal, then the information can be an incoming call information related to the incoming call signal (e.g., name and phone number of the phone caller); if the specific signal received by the starting module 24 is a short message, then the information can be a short message information related to the short message (e.g., name and phone number of the short message sender).

In the second way, the sensing module 26 also performs a sensing procedure by an optical way. However, the difference between the second way and the first way is that before the sensing module 26 performs the light sensing, the sensing module 26 emits a specific light (e.g., the infrared rays).

After the sensing module 26 receives the starting signal, the sensing module 26 will emit the specific lights from the first face and the second face of the portable electronic apparatus 2 respectively. Once the specific lights are blocked by an object or other obstruction, the specific lights are possible to be reflected or refracted back to the portable electronic apparatus 2. Therefore, the sensing module 26 can determine the distance d1' between the first face and the object according to a time interval T1'. T1' is the time interval between a time t13 that the sensing module 26 emits the specific light from the first face and a time t14 that the sensing module 26 receives the reflected specific light. Similarly, the sensing module 26 can also determine the distance d2' between the second face and the object according to a time interval T2'. T2' is the time interval between a time t23 that the sensing module 26 emits the specific light from the second face and a time t24 that the sensing module 26 receives the reflected specific light.

Then, the controlling module 28 will calculate the possible using state of the user for the moment according to the sensing result (d1' and d2') obtained by the sensing module 26, and selectively display the incoming call information on the first displaying module 20 of the first face or the second displaying module 22 of the second face. In fact, the information can relate to the specific signal received by the starting module 24.

For example, if d1' sensed by the sensing module 26 is far smaller than d2', it means that it is possible that the portable electronic apparatus 2 is set upon a desk, and the first face of the portable electronic apparatus 2 is downward and the second face is upward. Thus, the controlling module 28 will display the information on the upward second face according to this calculating result, so that the user can easily read the information.

The third way is that after the sensing module 26 receives the starting signal, the sensing module 26 will perform the orientation sensing toward the first face and the second face by the gravity way, and judge which one is the upper face between the first face and the second face according to the sensing result.

It should be noticed that the so-called "upper face" is the face with higher position of the two faces of the portable electronic apparatus 2. Because it is possible that the upper face is the face that the user watches when he/she uses the portable electronic apparatus 2, so the controlling module 28 will display the information on the monitor of the upper face. In fact, the information can relate to the specific signal received by the starting module 24. For example, if the judging result of the sensing module 26 is that the second face is the upper face, it means that the user may watch the second face at the moment, so that the controlling module 28 will display the information on the second displaying module 22 of the second face.

A fourth embodiment of the invention is a dual-monitor portable electronic apparatus. The two monitors are disposed on the first face and the second face of the portable electronic apparatus respectively. Its appearance view can refer to FIG. 1(A) and FIG. 1(B). Please refer to FIG. 5. FIG. 5 shows the functional block diagram of the portable electronic apparatus. As shown in FIG. 5, the portable electronic apparatus 2 comprises a first displaying module 20, a second displaying module 22, a starting module 24, a sensing module 26, and a controlling module 28. The sensing module 26 is coupled to the starting module 24, and the controlling module 28 is coupled to the first displaying module 20, the second displaying module 22, and the sensing module 26.

In this embodiment, when the starting module 24 receives a specific signal, the starting module 24 will generate a starting signal. Then, after the sensing module 26 receives the starting signal, the sensing module 26 will perform a sensing procedure to generate a sensing result. In fact, the sensing result can relate to a suitable reading face chosen between the first face and the second face of the portable electronic apparatus 2. As to the ways the sensing module 26 performs the sensing procedure, such as sensing by optical or gravity method, they are not described again here since they are all described in detail in the above-mentioned examples.

It should be noticed that although the portable electronic apparatus 2 in this embodiment and the third embodiment has the same functional block diagram, the most obvious difference between this embodiment and the third embodiment is the functions provided by the controlling module 28. In this embodiment, the controlling module 28 is used to selectively control the first displaying module 20 or the second displaying module 22 under a specific state according to the sensing result. In fact, the above-mentioned specific state can be a powered-on state, a powered-off state, an idling state, or a sleeping state.

For example, if d1' sensed by the sensing module 26 is far larger than d2', it means that it is possible that the portable electronic apparatus 2 is set upon a desk, and the second face of the portable electronic apparatus 2 is downward and the second face is upward. At this time, it is more possible for the user to use the first face of the portable electronic apparatus 2. Thus, the controlling module 28 will control the first face under the powered-on state according to this calculating result so that the user can use the portable electronic apparatus 2 more easily. In addition, the controlling module 28 can also control the second face under the sleeping state or the idling state at the same time to reduce the unnecessary power waste.

Compared to the prior art, the portable electronic apparatus according to the invention can automatically select a suitable reading monitor from the two monitors for the user and display an incoming call message on the monitor. Therefore, the dual-monitor portable electronic apparatus according to the invention can prevent the inconvenience of operating the conventional dual-monitor portable electronic apparatus by hands and provide the user more convenient and humanistic operating experience.

With the recitations of the preferred embodiment above, the features and spirits of the invention will be hopefully well described. However, the scope of the invention is not restricted by the preferred embodiment disclosed above. The objective is that all alternative and equivalent arrangements are hopefully covered in the scope of the appended claims of the invention. Accordingly, the above disclosure should be construed as limited only by the metes and bounds of the appended claims.

What is claimed is:

1. A portable electronic apparatus, comprising:
   a casing having a first face and a second face;
   a first displaying module disposed on the first face of the casing;
   a second displaying module disposed on the second face of the casing;
   a communicating module for receiving an incoming call from outside, when the communicating module receives an incoming call signal, the communicating module generating a starting signal;
   a sensing module, coupled to the communicating module, when the sensing module receives the starting signal from the communicating module, the sensing module performing a sensing procedure to generate a sensing result; and
   a controlling module, coupled to the first displaying module, the second displaying module and the sensing module, the controlling module selectively displaying an incoming call information on the first displaying module or the second displaying module according to the sensing result, wherein the incoming call information relates to the incoming call signal,
   wherein the sensing result relates to a suitable reading face chosen between the first face and the second face, and the controlling module displays the incoming call information on the first displaying module or the second displaying module set on the suitable reading face, and
   wherein the sensing procedure is to sense which one is a brighter face between the first face and the second face by an optical way, and the suitable reading face is the brighter face.

2. A method of operating a portable electronic apparatus, the portable electronic apparatus comprising a first face and a second face, a first displaying module disposed on the first face and a second displaying module disposed on the second face, the method comprising the steps of:
   (a) judging whether the portable electronic apparatus receives an incoming call signal;

(b) if the portable electronic apparatus receives the incoming call signal, performing a sensing procedure to generate a sensing result; and (c) selectively displaying an incoming call information on the first displaying module or the second displaying module according to the sensing result, wherein the incoming call information relates to the incoming call signal, wherein in step (b), the sensing result relates to a suitable reading face chosen between the first face and the second face, and in step (c), the incoming call information is displayed on the first displaying module or the second displaying module set on the suitable reading face, and wherein in step (b), the sensing procedure is to sense which one is a brighter face between the first face and the second face by an optical way, and the suitable reading face is the brighter face.

3. A portable electronic apparatus, comprising:

a casing having a first face and a second face;

a first displaying module disposed on the first face of the casing; a second displaying module disposed on the second face of the casing;

a starting module, when the starting module receives a specific signal, the starting module generating a starting signal;

a sensing module, coupled to the starting module, when the sensing module receives the starting signal, the sensing module performing a sensing procedure to generate a sensing result; and a controlling module, coupled to the first displaying module, the second displaying module and the sensing module, the controlling module selectively displaying an information on the first displaying module or the second displaying module according to the sensing result, wherein the sensing result relates to a suitable reading face chosen between the first face and the second face, and the controlling module displays the incoming call information on the first displaying module or the second displaying module set on the suitable reading face, and wherein the sensing procedure is to sense which one is a brighter face between the first face and the second face by an optical way, and the suitable reading face is the brighter face.

4. The portable electronic apparatus of claim 3, wherein the starting module is used for receiving incoming call from outside, and when the starting module receives an incoming call signal, the starting module generates the starting signal.

5. The portable electronic apparatus of claim 3, wherein the information displayed on the first displaying module or the second displaying module relates to the specific signal received by the starting module.

6. A portable electronic apparatus, comprising:

a casing having a first face and a second face;

a first displaying module disposed on the first face of the casing;

a second displaying module disposed on the second face of the casing;

a starting module, when the starting module receives a specific signal, the starting module generating a starting signal;

a sensing module, coupled to the starting module, when the sensing module receives the starting signal, the sensing module performing a sensing procedure to generate a sensing result; and a controlling module, coupled to the first displaying module, the second displaying module and the sensing module, the controlling module selectively controlling the first displaying module or the second displaying module under a specific state according to the sensing result, wherein the sensing result relates to a suitable reading face chosen between the first face and the second face, and the controlling module displays the incoming call information on the first displaying module or the second displaying module set on the suitable reading face, and wherein the sensing procedure is to sense which one is a brighter face between the first face and the second face by an optical way, and the suitable reading face is the brighter face.

7. The portable electronic apparatus of claim 6, wherein the starting module is used for receiving incoming call from outside, and when the starting module receives an incoming call signal, the starting module generates the starting signal.

* * * * *